J. BERTHÓTY.
WIRE GRATE MANUFACTURING MACHINE.
APPLICATION FILED JAN. 25, 1916.
1,184,712.
Patented May 30, 1916.
6 SHEETS—SHEET 1.
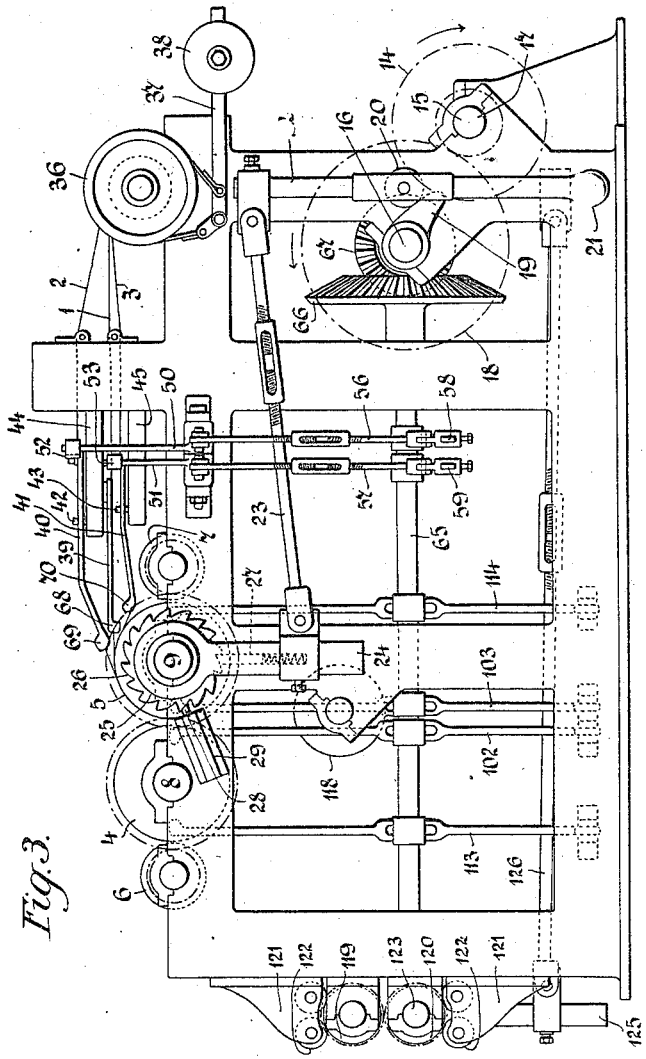
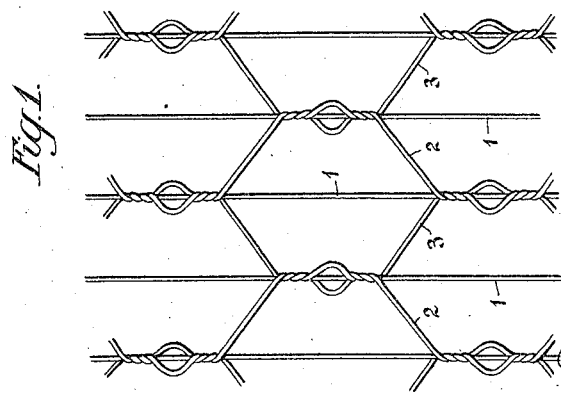
Inventor:
Josef Berthóty

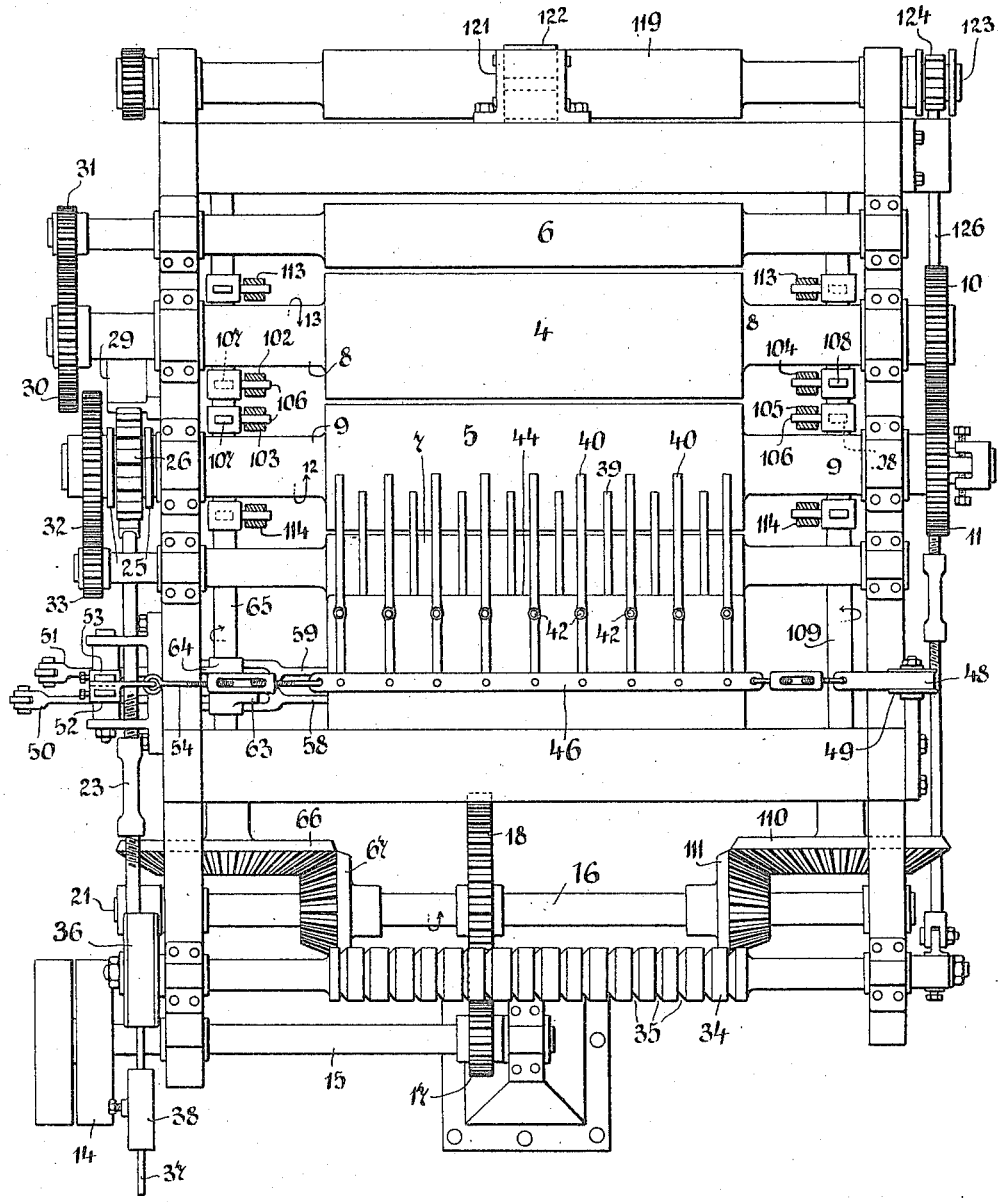

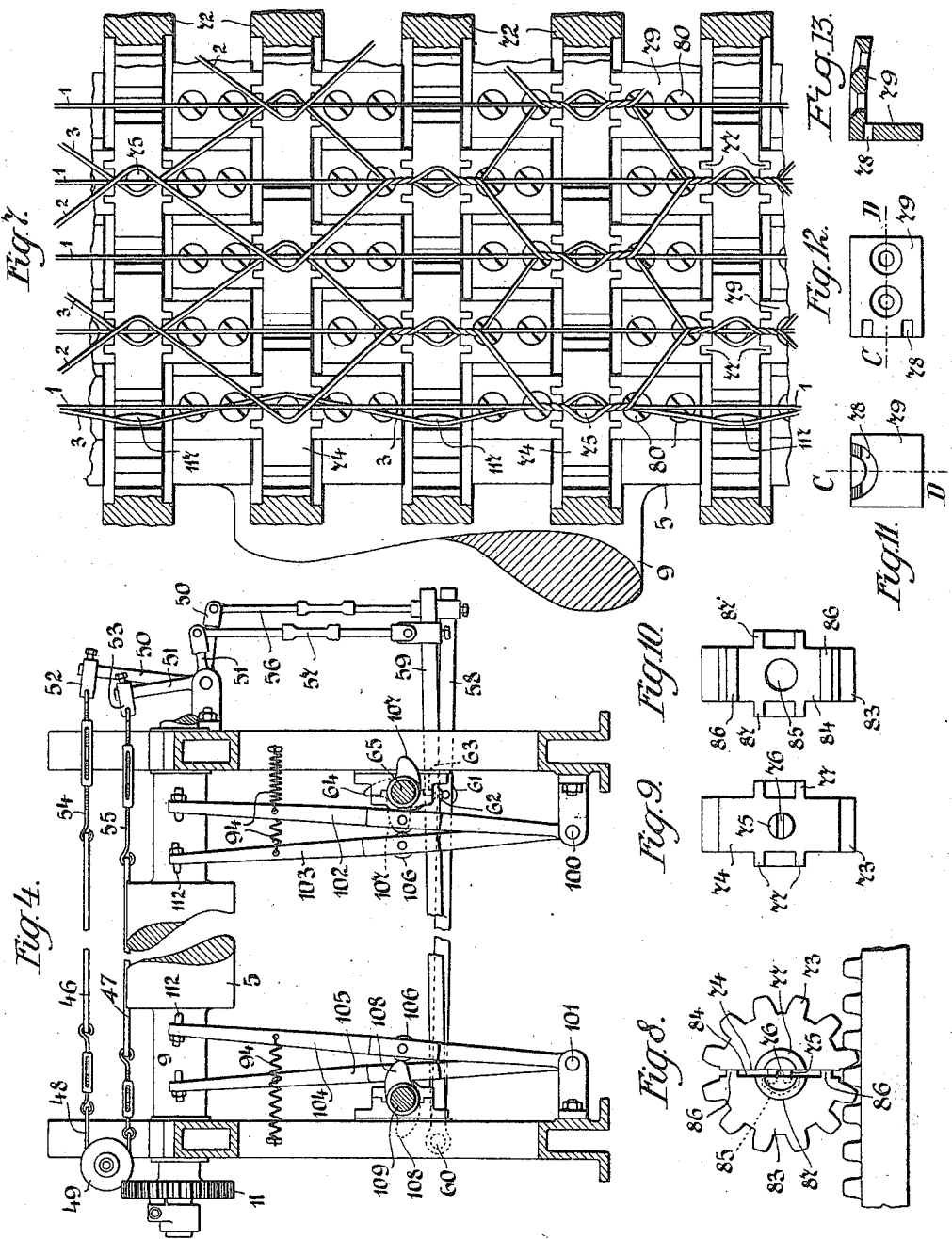

J. BERTHÓTY.
WIRE GRATE MANUFACTURING MACHINE.
APPLICATION FILED JAN. 25, 1916.
1,184,712.
Patented May 30, 1916.
6 SHEETS—SHEET 4.
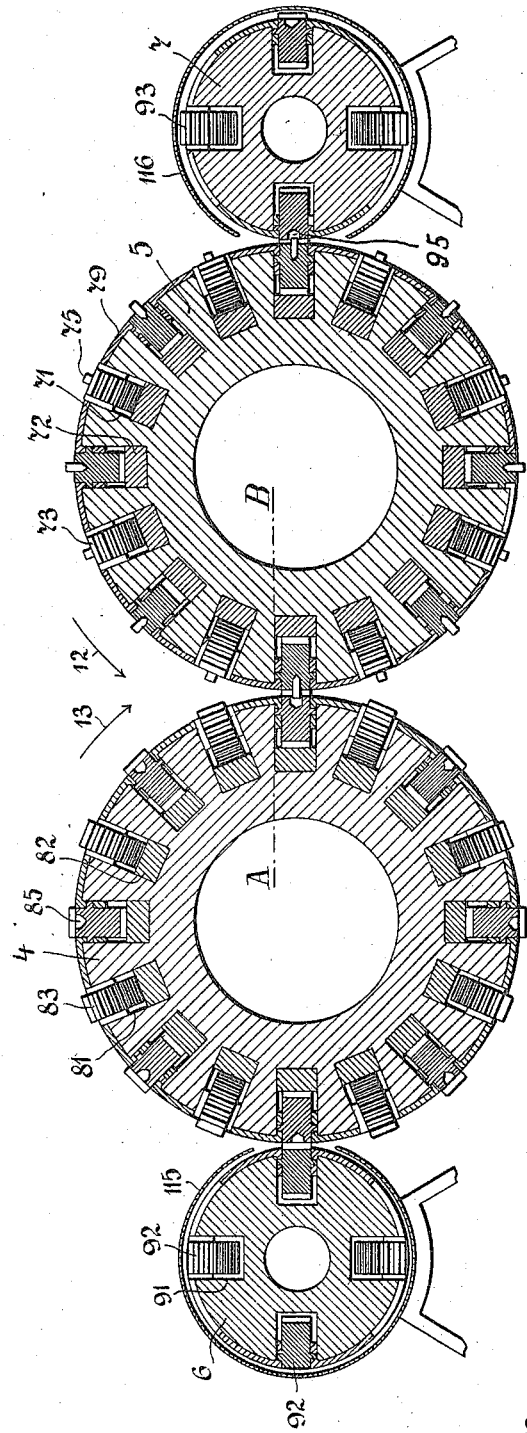

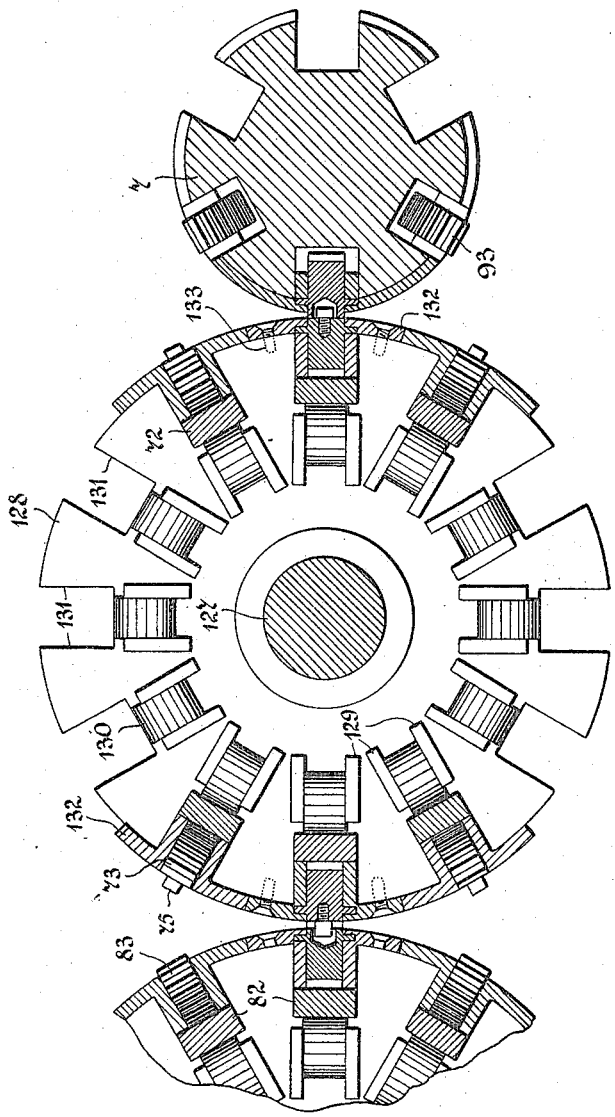

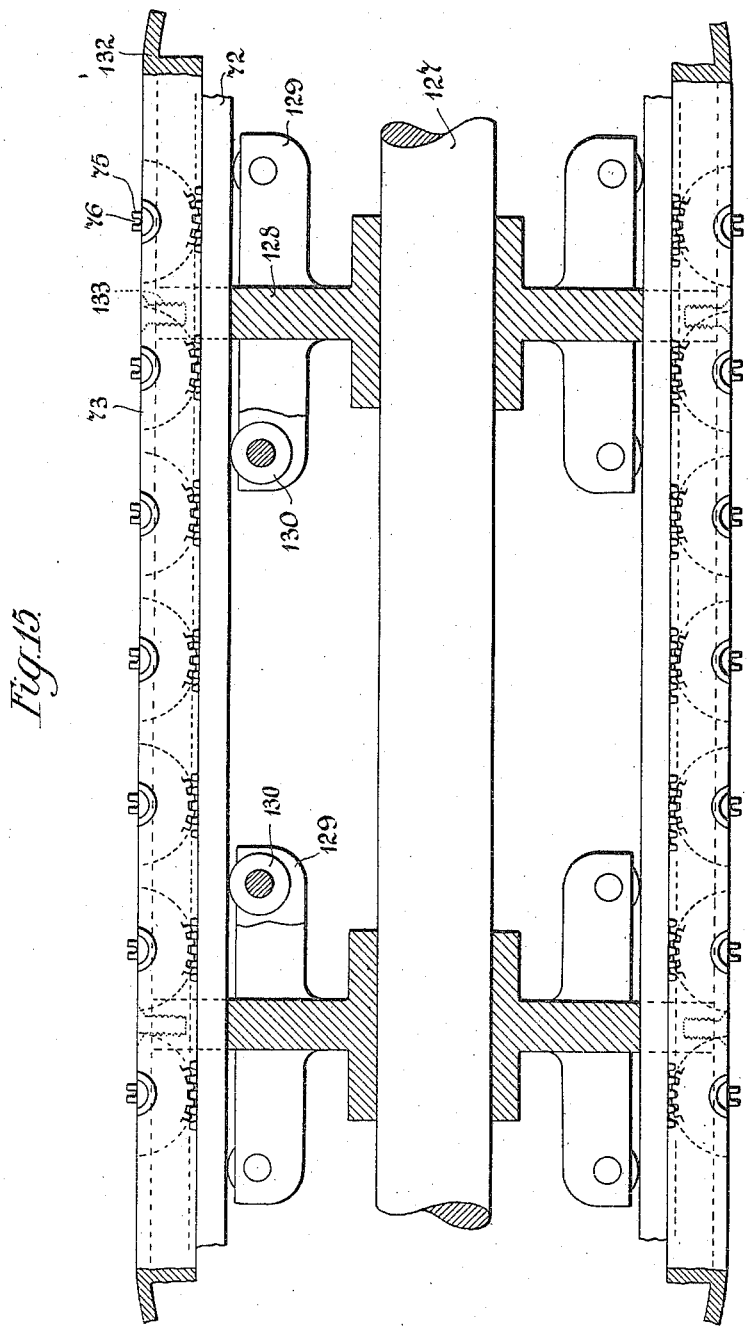

UNITED STATES PATENT OFFICE.

JOSEF BERTHÓTY, OF BUDAPEST, AUSTRIA-HUNGARY.

WIRE-GRATE-MANUFACTURING MACHINE.

1,184,712.　　　　　Specification of Letters Patent.　　Patented May 30, 1916.

Application filed January 25, 1916. Serial No. 74,090.

*To all whom it may concern:*

Be it known that I, JOSEF BERTHÓTY, a citizen of the Kingdom of Hungary, residing at Budapest, Austria-Hungary, have invented certain new and useful Improvements in Wire-Grate-Manufacturing Machines, of which the following is a specification.

My invention relates to a machine for manufacturing wire-grates consisting of parallel wires connected by cross-wires which are twisted around the parallel wires, at certain places.

In the drawings: Figure 1 is a representation of my new wire-grate, Fig. 2 is a plan-view of the machine according to my invention, Fig. 3 is a side-view and Fig. 4 a broken cross-section thereof, Fig. 5 shows the working-cylinders in cross-section, Fig. 6 is a section along line A—B in Fig. 5, Fig. 7 is an enlarged plan view of one of the working-cylinders developed. Figs. 8 to 13 show certain detail parts, Fig. 13 being a cross-section along line C—D in either of Figs. 11 and 12, Fig. 14 shows a modification of the working cylinders in cross-section, Fig. 15 is a longitudinal section of one of these modified working cylinders; Figs. 16 and 17 show a detail in plan and front view; Figs. 18, 19, and 20 are respectively side, front, and plan views of another detail; and Figs. 21 and 22 are plan and front views of another detail.

The machine for manufacturing wire-grates consists substantially of two working cylinders 4 and 5, hereinafter described, (Figs. 2, 3 and 5) which coöperate with two auxiliary cylinders 6 and 7. The shafts 8 and 9 of the working cylinders 4 and 5 are coupled by means of gears 10 and 11 (Fig. 2), so that these working cylinders will rotate in opposite directions as indicated in Figs. 2 and 5 by the arrows 12 and 13.

The working cylinders are driven as follows: The counter shaft 15 carrying the belt pulley 14 is connected to the power shaft 16 by the gears 17 and 18. On shaft 16 the cam 19 is mounted (Fig. 3), which actuates the roller 20 on the lever 22 pivoted at 21. The lever 22 is connected by means of a connecting rod 23 to the ratchet arm 24, which is loosely mounted on the shaft 9 of the working cylinder 5, by means of its fork-shaped head 25. In the fork of the latter is held the ratchet wheel 26 (Figs. 2 and 3), with which coöperates the spring-actuated pawl 27 of the ratchet, to transmit the oscillations of the ratchet arm to the ratchet wheel 26, whereby the working cylinder 5 is rotated step-by-step imparting a similar rotation; but in the opposite direction to the working cylinder 4. The ratio of transmission is so selected, that for each rotation of the power shaft 16 the ratchet wheel 26 is rotated one tooth; and the backward rotation of the ratchet wheel 26 is prevented by the spring-actuated pawl 28, which slides in a guide 29 fastened to the frame of the machine. The auxiliary cylinders 6 and 7 are driven respectively by means of the gears 30, 31 and 32, 33 from the working cylinders 4, 5 (Fig. 2,) the ratio of transmission being 1 to 4, as shown.

The wires for the manufacture of the wire grates are fed from supply coils, not shown in the drawings, over the roller 34 (Fig. 2,) provided for each wire with a conical groove 35. In these grooves the wires are guided to the working cylinders. The roller 34 is rotatably arranged in the frame of the machine and by the advancing wires is step-by-step rotated.

For the regulation of the tension of the wires as they pass from the roller 34 to the working cylinder there is arranged an adjustable brake 36, 37 and 38, which is connected to the roller 34. However, any suitable means for guiding and tensioning may be used. From the roller 34 the wires 1, 2 and 3 are passed over guide-bars 39, 40 and 41 (Fig. 3) to the working cylinder 5, by which guide-bars the wires are guided in a straight line or cross-wise as required. The guide bars 39, over which the straight wires 1 pass, are stationary, while the guide bars 40 and 41 for guiding the wires 2 and 3 cross-wise are adapted to oscillate about vertical pivots 42 and 43. The pivots 42 and 43 are fastened to the projecting plates 44 and 45 of the frame of the machine. The guide bars 40 are hinged to the horizontal rod 46, while the guide bars 41 are hinged to the horizontal rod 47 (Fig. 4), adapted to move sidewise in longitudinal direction for oscillating the guide bars. Fig. 2 shows all the guide bars in their normal position.

The rods 46 and 47 are on one end connected to the flexible belt or steel ribbon 48, passing around the roller 49, so that the rods 46 and 47 will be moved alternately in opposite directions. This motion of the rods 46 and 47 is effected by the bell-crank levers 50 and 51, which are pivoted on the frame of the machine (Fig. 4). The upright arms of the levers 50 and 51 are connected by the adjustable heads 52 and 53 and the adjustable connecting rods 54 and 55 to the ends of the rods 46 and 47, so that these rods 46 and 47 will be moved to and fro by the alternating motion of the levers 50 and 51 about their pivots. The horizontal arms of these levers are connected by means of adjustable connecting rods 56 and 57 to the levers 58 and 59, pivotal at 60 on the frame of the machine. On the levers 58 and 59 the rollers 61 and 62 are mounted (Fig. 4), adapted to be engaged by the cams 63 and 64. The latter are mounted on the shaft 65, which is driven by means of the bevel gears 66 and 67 from the shaft 16 (Fig. 3). On each rotation of the shaft 65 (Fig. 2) the levers 58 and 59 are once pressed down alternately by the cams 63 and 64 and then released, and the bell-crank levers 50 and 51 are alternately rocked on their pivots, imparting movement to the rods 46 and 47. Consequently the guide-bars 40 and 41 will be oscillated alternately. The free ends of the guide-bars 39, 40 and 41 are provided with heads 68, 69 and 70 for guiding and maintaining the wires in their places; these heads being shown in Figs. 16 to 22.

The wire grate is formed on the working cylinder 5, which is provided with a suitable equipment for this purpose, (see Figs. 5, 6, and 7). The cylinder 5 coöperates with the cylinders 4 and 7 provided with devices similar to those of the cylinder 5. These devices are not shown in Figs. 2 and 4, where the cylinders 4 and 7 are conventionally shown as smooth cylinders.

In the construction disclosed in the drawing the cylinder 5 has on its surface, corresponding to the number of the teeth of the ratchet-wheel 26, sixteen longitudinal grooves 71, which are parallel to the axis of the cylinder and in each of which a rack-bar 72 is removably arranged. Each rack-bar 72 engages with a series of toothed-sectors 73, which are held normally in such a position, that their plane surfaces 74 (Fig. 7) are flush with the surface of the cylinder and parallel with its axis. In Figs. 8 and 9 such a toothed-sector 73 is shown in detail. Each sector 73 is provided in the center of its plane surface 74 with a small projecting pin 75, having a groove 76. Each sector is provided with hubs 77, by means of which it is rotatably mounted in a correspondingly shaped groove 78 of a separate bearing-piece 79 (Figs. 11, 12 and 13). For each sector 73 there are provided two such bearing-pieces 79 fastened by means of screws 80 to the surface of the cylinder 5 (Fig. 7). This arrangement permits a rotation of the sectors, at the same time preventing the sectors from becoming dislodged. The working-cylinder 4 is constructed in a similar manner. It has likewise sixteen longitudinal grooves 81, in which the rack-bars 82 are movably guided; and with these rack-bars 82 engage the toothed-sectors 83, each of which forms with a corresponding sector 73 and a complete toothed-wheel (Fig. 8). The sectors 83 are provided likewise with half-cylindrical hubs 87, which together with the hubs 77 of the sectors 73 form annular trunnions (Fig. 8). The sectors 83 are provided in the center of their plane surfaces 84 with a recess 85, into which the pins 75 of the sectors 73 can enter. The sectors 83 are further provided with two lugs 86 adapted to be on the surfaces 74 of the sectors 73, so that in the position of the sectors 73 and 83 as shown in Fig. 8, the pins 75 do not touch the bottom of the recess 85, a free space being left for the passage of the wires between the surface 74 and 84. The auxiliary cylinders 6 and 7 are provided, similar to the working cylinders, with longitudinal grooves 91 (Fig. 5), in which the toothed sectors 92, 93 are rotatably mounted. The sectors 93 of the cylinder 7, coöperate with the sectors 73 of the cylinder 5 and are provided with the recesses 95, into which the pins 75 enter. The sectors 92 and 93 are so shaped, that the sectors 92 together with the half-wheels 83 and the sectors 93 together with the sectors 73 form whole toothed-wheels, which are rotated by the longitudinal movement of the rack-bars 72 and 82 respectively.

The operation is as follows: The stationary guide-bars 39 guiding the wires 1 are so arranged that the heads 68 (Figs. 3, 18, 19 and 20) with their downwardly directed side-plates surround on both sides the pins 75 of the sectors 73, so that, the pins 75 upon the stepwise rotation of the working cylinder 5 pass under the heads 68 of the guide-bars 39 (Fig. 18). The wires 1 guided in these heads 68 will enter the grooves 76 of these pins (Fig. 7). At the same time the wires 2 and 3 are guided by the oscillating guide-bars 40 and 41, so that they will pass alternately around the pins 75 of two adjacent series of sectors, as shown in the upper part of Fig. 7. The wires 3, their corresponding guide-bars 41 being in the lowest position (Fig. 3), will be placed direct on the sectors. The guide bars 39 being the next higher ones, the wires 1 will pass over the wires 3, and the guide bars 40 being still higher, the wires 2 will pass over the wires 1. The working cylinder 5 on each revolution of the power shaft 16 is rotated one step bringing into operative position a new series of sectors, while the guide-bars 40 and 41 perform half an oscillation, because the shaft 65 owing to the ratio 1 to 2 of the gear wheels 67 and 66, makes during one revolution of the power shaft 16 only half a revolution. By the rotation of the working cylinder 5 and oscillation of the guide-bars 40 and 41 as described, the wires are placed on the working cylinder 5, as just explained, and remain in position until the sectors 73 meet with the sectors 83 of the working cylinder 4, as shown in Figs. 5 and 6. The rack-bars 72 and 82 will now be moved in the opposite sense, so that the sectors 73 and 83, forming one toothed wheel, make one complete rotation, the sectors 73 turning out of the grooves 71 into the grooves 81 and back again into the grooves 71. On the other side the sectors 83 turn out of the grooves 81 into the grooves 71 and back into the grooves 81. Through this rotation of the sectors the wires 1, 2 and 3 are twisted together, as shown in Fig. 1 and the lower part of Fig. 7.

The above described movement of the rack-bars 72 and 82 is effected by the levers 102, 103, 104 and 105 adapted to rock about the pivots 100 and 101 (Figs. 3 and 4). These levers are provided with rollers 106, on which actuate the cams 107 and 108; and the cams 107 are arranged on the shaft 65, while the cams 108 sit in the shaft 109 journaled on the frame of the machine. The shaft 109 is driven in the same manner as the shaft 65, from the power shaft 16 by bevel gears 110 and 111. Both the cams 107 and 108 are oppositely arranged so that the levers 102 and 103 of the one side of the machine and the levers 104 and 105 of the other side are alternately pushed inward by their respective cams 107 and 108 and released. The levers 102 to 105 are each provided on their upper free ends with adjustable bolts 112, which on the levers being pushed inward press against the ends of the rack-bars, moving them in longitudinal direction. The levers 102 and 104 are in contact with the opposite ends of the rack-bars 82, and the levers 103 and 105 with the ends of the other rack-bars 72. The levers 102 to 105 are normally held outward by the springs 94, the rollers 106 being thus always in contact with the corresponding cams. The rack-bars 72 and 82 are displaced in opposite directions at the time when both working-cylinders 4 and 5 are at rest in the position shown in Fig. 5; and as soon as the working-cylinders are rotated another step the rack-bars pass below the point of contact of the working-cylinders, but remain in the displaced position until the rack-bars 82 of cylinder 4 arrive at the point of contact of the cylinders 4 and 6, and the rack-bars 72 of cylinder 5 arrive at the point of contact of the cylinders 5 and 7 (see position shown in Fig. 5). Here levers 113 and 114 are provided, which like the levers 102 to 105 (Fig. 3) are rocked about their pivots by the rotation of the shafts 65 and 109, whereby the rack-bars 72 and 82 are pushed to their initial positions, during which movement the sectors 73 together with the half-wheels 93 and the sectors 83 together with the sectors 92 make one complete revolution. The sectors 73 and 83 engaging in the rack-bars 72 and 82, these sectors are maintained during the rotation of the working-cylinders in their positions; but the sectors 92 and 93 of the auxiliary cylinders can not be maintained in their positions because in the auxiliary cylinders are no rack-bars, so that during the rotation of the auxiliary cylinders their sectors can easily rotate. To prevent this, the auxiliary cylinders 6 and 7 are surrounded with stationary iron hoods 115 and 116 (Fig. 5), which at the place of contact of the auxiliary cylinders with the working cylinders are open, but otherwise closely surround the auxiliary cylinders, whereby an unintentional rotation of the sectors 92 and 93 is prevented.

In order to produce an edge on both sides of the grate (see Fig. 7, left side) outside of the last parallel wire 1, curved projections 117 are provided on the working cylinder 5, around which projections passes the last wire 3. Between each two projections 117 the sector 73 is arranged, so that the wires are twisted also at certain places on the edge of the grate. The finished grate is guided by the working cylinder 5 over the roller 118 (Fig. 3), from where it passes out between the movable rollers 119 and 120, between which the grate will be somewhat pressed. The rollers 119 and 120 are pressed together by cams 122 mounted on supports 121, which can also be adjusted. To the shaft 123 of the cylinder 120 the ratchet-wheel 124 is fixed (Fig. 2), which is turned, corresponding to the feed-motion of the grate, by the ratchet-arm 125. The latter is moved in the same manner as the ratchet-arm 24, by the rod 126 and a rocking lever, adapted to be rocked about its pivot by a cam arranged on the shaft 16.

The modified construction of the working cylinders represented in Figs. 14 and 15 shows a shaft 127, to which a series of disks 128 are fastened. These disks 128 are provided on both sides with projecting arms 129, between which the rollers 130 are arranged. These rack-bars 72 and 82 lie on the rollers 130 and are guided in the openings 131 of the disks 128. The sectors 73 and 83 are arranged as in the construction first described, with the difference, that for a whole series of sectors two angular bearing rods 132 are provided, which are fastened to the disks 128 by screws 133. The rods 132 also have grooves for the hubs of the sector.

Claims:

1. In a wire-grate manufacturing machine, the combination of a pair of rotatable working cylinders, means for rotating the said cylinders in opposite direction relative to each other, a plurality of toothed sectors arranged in longitudinal grooves provided in the periphery of the said working cylinders, a grooved pin projecting from the plane surface of each of the toothed sectors of one of the said two working cylinders, the plane surfaces of the toothed sectors of the other working cylinder being each provided with a recess adapted to receive the said grooved pins, rack-bars arranged in the grooves of the said two working cylinders and adapted to rotate the said toothed sectors, the toothed sectors of the said two working cylinders forming a complete toothed wheel along the line of contact of the said two cylinders, means for reciprocating the said rack-bars to rotate said toothed sectors at the required time, means for placing wires into the grooves of the pins of one series of the said toothed sectors, and means for passing wires alternately around the pins of two adjacent series of said toothed sectors.

2. In a wire-grate manufacturing machine, the combination of a pair of rotatable working cylinders, means for rotating the said cylinders in opposite directions relative to each other, a plurality of toothed sectors arranged in longitudinal grooves provided in the periphery of the said working cylinders, a grooved pin projecting from the plane surface of each of the toothed sectors of one of the said two working cylinders, the plane surfaces of the toothed sectors of the other working cylinder being each provided with a recess adapted to receive the said grooved pins, rack-bars arranged in the grooves of the said two working cylinders and adapted to rotate the said toothed sectors, the toothed sectors of the said two working cylinders forming a complete toothed wheel along the line of contact of the said working cylinders, means for reciprocating the said rack-bars to rotate the toothed sectors at the required time, stationary guide-bars for placing wires into the grooves of the grooved pins of one series of the said toothed sectors, and oscillating guide-bars for passing wires alternately around the pins of two adjacent series of toothed sectors.

3. In a wire-grate manufacturing machine, the combination of a pair of rotatable working cylinders, means for rotating said cylinders in opposite direction relative to each other, a plurality of toothed sectors arranged in longitudinal grooves provided in the periphery of the said working cylinders, a grooved pin projecting from the plane surface of each of said toothed sectors of one of the said two working cylinders, the plane surfaces of the toothed sectors of the other working cylinder having each a recess adapted to receive the said grooved pins, rack-bars arranged in the grooves of the said working cylinders and adapted to rotate the said toothed sectors, the toothed sectors of the said two working cylinders forming a complete toothed wheel along the line of contact of the said two working cylinders, means for reciprocating said rack-bars to rotate the said toothed sectors at the required time, stationary guide-bars for placing wires into the grooves of the pins of one series of the said toothed sectors, oscillating guide-bars for passing wires alternately around the pins of two adjacent series of the said toothed sectors, and heads provided on the free ends of the said guide-bars for maintaining the wires in their positions.

4. In a wire-grate manufacturing machine, the combination of a pair of rotatable working cylinders, means for rotating the cylinders in opposite direction relative to each other, a plurality of toothed sectors arranged in longitudinal grooves provided in the periphery of the said two cylinders, a grooved pin projecting from the plane surface of each of the said toothed sectors of one of the working cylinders, the plane surfaces of the toothed sectors of the other working cylinder having each a recess adapted to receive the said grooved pins, rack-bars arranged in the grooves of the said working cylinders for rotating the toothed sectors, the toothed sectors of the said two cylinders forming a complete toothed wheel along the line of contact of the said two working cylinders, means for reciprocating said rack-bars to rotate the said toothed sectors at the required time, stationary guide bars for placing wires into the grooves of the pins of one series of the said toothed sectors, oscillating guide-bars for passing wires alternately around the pins of two adjacent series of toothed sectors, heads provided on the free ends of the said guide-bars for maintaining the wires in their positions, and side-plates on the heads of the said stationary guide-bars adapted to surround the pins of the said toothed sectors on both sides.

5. In a wire-grate manufacturing machine, the combination of a pair of rotatable working cylinders, means for rotating the cylinders in opposite direction relative to each other, a plurality of toothed sectors arranged in longitudinal grooves provided in the periphery of the said two working cylinders, a grooved pin projecting from the plane surface of the toothed sectors of one of the said working cylinders, the plane surfaces of the toothed sectors of the other working cylinder having each a recess adapted to receive the grooved pins, rack-bars arranged in the longitudinal grooves of the said two working cylinders and adapted to rotate the said toothed sectors, the toothed sectors of the said two working cylinders forming a complete toothed wheel along the line of contact of the said working cylinders, means for reciprocating the said rack-bars to rotate said toothed sectors at the required time, means for placing wires into the grooves of the pins of one of the series of the said toothed sectors, means for passing wires alternately around the pins of two adjacent series of the said toothed sectors, rotatable auxiliary cylinders adapted to coöperate with the said two working cylinders, a plurality of toothed sectors arranged in grooves provided in the periphery of the said auxiliary cylinders and adapted to complement the toothed sectors of the said working cylinders, forming therewith a complete toothed wheel, as the toothed sectors of the working cylinders are brought into a position opposite the toothed sectors of the corresponding auxiliary cylinder, and means to positively return the said rack-bars to their initial positions at the time when one series of toothed sectors of the said working cylinders are opposite one series of toothed sectors of the corresponding auxiliary cylinder.

In testimony whereof I have affixed my signature in presence of two witnesses.

JOSEF BERTHÓTY.

Witnesses:
 FULOP LETION,
 GOLDENBERG ROBELY.

Copies of this patent may be obtained for five cents each, by addressing the "Commissioner of Patents, Washington, D. C."